United States Patent [19]
Eich et al.

[11] Patent Number: 4,837,745
[45] Date of Patent: Jun. 6, 1989

[54] PROCESS FOR THE REVERSIBLE OPTICAL STORAGE OF DATA

[75] Inventors: Manfred Eich, Frankfurt; Joachim Wendorff, Nauheim; Bernd Reck, Mannheim, all of Fed. Rep. of Germany

[73] Assignee: Röhm GmbH Chemische Fabrik, Darmstadt, Fed. Rep. of Germany

[21] Appl. No.: 10,778

[22] Filed: Feb. 3, 1987

[30] Foreign Application Priority Data

Feb. 4, 1986 [DE] Fed. Rep. of Germany ....... 3603268

[51] Int. Cl.$^4$ .............................................. G11C 13/04
[52] U.S. Cl. .................................... 365/108; 350/330
[58] Field of Search ................ 350/330; 365/108, 189, 365/230

[56] References Cited

U.S. PATENT DOCUMENTS

| | | |
|---|---|---|
| 2,978,437 | 4/1961 | Christenson . |
| 4,293,435 | 10/1981 | Portugall et al. . |
| 4,325,739 | 4/1982 | Biermann et al. . |
| 4,702,558 | 10/1987 | Coles et al. . |

FOREIGN PATENT DOCUMENTS

| | | |
|---|---|---|
| 7574 | 2/1980 | European Pat. Off. . |
| 054217 | 12/1980 | European Pat. Off. . |
| 0044893 | 2/1982 | European Pat. Off. . |
| 090282 | 3/1982 | European Pat. Off. . |
| 0065869 | 12/1982 | European Pat. Off. . |
| 140133 | 9/1983 | European Pat. Off. . |
| 141512 | 5/1985 | European Pat. Off. . |
| 171045 | 12/1986 | European Pat. Off. . |
| 2740076 | 3/1978 | Fed. Rep. of Germany . |
| 3324770 | 1/1984 | Fed. Rep. of Germany . |
| 2079304 | 1/1982 | United Kingdom . |
| 2094822 | 9/1982 | United Kingdom . |
| 2146787 | 4/1985 | United Kingdom . |

OTHER PUBLICATIONS

The Transactions of the IECE of Japan, Band E61, No. 6; K. Kubota et al; "Hologram Memory Using One Dimensional Fourier Transform-Image Hologram", Seite 493, 12/86.

*Primary Examiner*—Terrell W. Fears
*Attorney, Agent, or Firm*—Oblon, Fisher, Spivak, McClelland & Maier

[57] ABSTRACT

The invention concerns a process for reversible optical information storage by means of a liquid crystal storage medium, whereby the information is stored in a firm of a liquid crystal side chain polymer in an anisotropic phase by means of locally acting heat source in combination with an electric, magnetic or surfaces active field, through local reorientation.

31 Claims, 1 Drawing Sheet

Fig.1

PROCESS FOR THE REVERSIBLE OPTICAL STORAGE OF DATA

BACKGROUND OF THE INVENTION

1. Field of the Invention

The invention relates to a process for the reversible optical storage of data using polymeric liquid crystals.

2. Discussion of the Background

Between the solid crystalline phase and the fluid melt, designated hereafter as an isotropic melt, intermediate phases appear in certain substances, which from a structural and dynamic viewpoint combine properties of both the ordered, crystalline state and the disordered melt state within themselves. Thus such phases are fluid, but have, for example, optical properties which are characteristic of most of the crystalline and partially crystalline substances, i.e., they are birefringent. They are called for obvious reasons intermediate phases (mesophases) or liquid crystal phases. These intermediate phases may be obtained by a temperature variation (thermotropic liquid crystals) or in solution by means of concentration variations. Only thermotropic liquid crystals shall be considered hereinafter. To characterize the range of existence of these intermediate phases, the transition temperatures from the crystalline state into the liquid crystal state and from the liquid crystal state in the isotropic state clearing temperature, determined, for example, by calorimetry or by a polarizing microscope, are generally given. In case of the presence of different liquid crystal states, a set of corresponding transition temperatures is given.

The appearance of mesphases is associated with peculiarities in their molecular geometry. Spherically symmetric molecules cannot form mesophases. In contrast, molecules which may be characterized as cylindrical or disc-like can form mesophases. The molecules may be rigid and the ratio of their maximum to thrir minimum dimension (for example, length of cylinder/diameter of cylinder) must clearly exceed a critical value of about 3.

The structure of such mesophases is characterized in that in the simplest case for cylindrical molecules, in the so-called nematic phase, the molecular centers are distributed in a disordered manner as in an isotropic melt, while the longitudinal axes of the molecule are parallel to each other. This differs from the state in the isotropic melt, in which the molecular axes are statistically distributed. This results in anisotropic mechanical, electrical or optical properties. In the cholesteric phase, an additional ordering principle is present, i.e., a continously helical variation of the direction of orientation of the longitudinal molecular axes appears, leading to particular optical properties, such as strong optical activity or the selective reflection of light. Finally, in the so-called smectic phases there occurs in addition to the aforedescribed orientation order characteristic of the nematic state, a uniform arrangement of molecular centers of gravity in space, for example, along one spatial axis only, or in other smetic modifications along two or even three independent axes. In spite of this, these phases are fluid.

Disc shaped molecules are capable of forming so-called discotic phases, wherein either only the disc normals are oriented parallel to each other (see the nematic phase) or in which the discs are arranged within columns in a regular or irregular manner. These are referred to as columnar structures.

A characteristic value which is highly important for the application of liquid crystal structures is the orientation order parameter, which is a measure of the quality of the orientation order.

Its value is between 0, in case of complete disorientation (as in the isotropic melt), and 1, when all of the molecular longitudinal axes are oriented in a perfectly parallel manner.

The widespread application of liquid crystal substances in industrial products, such as display elements in pocket calculators, wrist watches or digital measuring instruments, is based on the particular property that the direction of orientation, which may be represented by the so-called director, is readily varied by external electrical, magnetic or mechanical fields. The resulting changes in optical properties may be used in combination with other components, such as polarizers, cell walls, etc., in display elements for the visualization of information. The cell walls serve to protect the fluid mesophases and determine the macroscopic configuration of the liquid crystal film required.

It has been discovered in recent years that in numerous fields of application it may be advantageous to combine the properties of liquid crystal phases with those of polymers. The advantageous polymer properties are good mechanical properties, making possible the production of thin, dimensionally stable films of these substances, together with the occurrence of a freezing process (glass transition), whereby the fixation of a predetermined orientation structure is made possible. The citation of the glass temperature ($T_g$), determined for example, by calorimetry, serves to characterize the range of existence of the solid liquid crystal phase. Above this temperature the polymer is in a viscoelastic or viscous plastic state.

Theories of the formation of liquid crystal phases generally and the formation of such phases in polymer systems in particular, together with experimental results, show that liquid crystal polymers can be produced from rigid mesogenic structural units which are characteristic of low molecular weight liquid crystals, in combination with flexible spacer groups and flexible chain molecules. In this process, different structural features are possible. The mesogenic groups are in the case of the class of side chain liquid crystals attached to a flexible or semiflexible main chain, by means of a spacer or even without one. The mesogenic groups may be cylindrical or disc-shaped. The main chain may contain mesogenic groups separated by flexible units. Copolymers, characterized in that different spacer and/or mesogenic groups appear within a single polymer, are also capable of forming liquid crystal phases.

In addition to these side chain liquid crystals, main chain polymers also exhibit liquid crystal phases under certain conditions. The conditions for this are that either the chains consist entirely of rigid groups, or of rigid and flexible groups. Copolymers of different mesogenic groups and/or spacer groups can also form liquid crystal phases. Mesogenic groups are of a cylindrical or rod-shaped configuration. The nature of the mesophases, the range of their existence and that of the glass phase may be adjusted approximately by means of the spacer length and flexibility, the flexibility of the main chain and its tacticity and length.

Heretofore only main chain polymers, exclusively with rigid units or overwhelmingly with rigid units, have been introduced practically in the market. They have extremely high strength and rigidity values. These self-strengthening thermoplastic synthetics are known. Their field of application consists of mechanical parts requiring extreme mechanical properties (Kirk-Othmer, Encyclopedia of Chemical Technology, 3rd ed., Vol. 14, pp. 414–421 (1984); J. H. Wendorff, Kunststoffe 73, 524–528 (1983); M. G. Dobb, J. E. McIntyre, Adv. Polym. Sci. 60/61, 61–98 (1984).

Polymers with flexible and rigid units have not been used heretofore in systems introduced in the market. Their advantage consists of having a high orientation parameter value compared to side chain liquid crystals (C. Noel, F. Laupretre, C. Friedrich, B. Fagolle, L. Bosio, Polymer 25, 808–814 (1984); B: Wunderlich, I. Grebowicz, Adv. Polymer Sci. 60/61, 1–60 (1984). Polymers with mesogenic side chains have also attracted attention in recent times (H. Finkelmann in "Polymer Liquid Crystals", Academic Press (1982); H. Finkelmann, G. Rehage, Adv. Polym. Science 60/61, 99–172 (1984); V. P. Shibaev, N. A. Plate, Adv. Polym. Science 60/61, 173–252 (1984).

From US 4,293,435 an industrial utilization of the specific behavior of liquid crystal polymers, connected with the transition into the glassy state, is known. Information is stored by the application of conditions which alter the arrangement and orientation of liquid crystal polymers in a defined manner (for example, electrical or magnetic fields). This is also discussed in GB No. 2,146,787. It is pointed out that the storge of the device provided for in U.S. Pat. No. 4,293,435 in the solid state below the glass temperature ($T_g$) signifies that $T_g$ is above the usual room temperature ($T_a$), i.e., that the polymer system is used at temperatures which are higher by about 100° C. over $T_a$, if the information is to be stored within a reasonable period of time. Such temperatures are unwieldy and lead in the long term to a decomposition of the polymer. According to GB No. 2,146,782, these difficulties may be avoided by the use of certain polymeric side chain liquid crystals. It is then no longer necessary to store the device at a temperature range below $T_g$ and stable storage for many years is possible at temperatures above $T_g$ and below a temperature ($T_f$), at which the polymer begins to liquify.

The $T_f$ may be determined by ovserving the passage of light through a liquid crystal polymer between two crossed polarizing filters at increasing temperatures starting from the glass temperature. A few degrees below the smectic-isotropic phase transition the transmission of light suddenly increases. This rise is the result of the transition of an anisotropic low transparency state to a highly birefringent, transparent state of the zone. The temperature range above this temperature $T_f$ is designated the "fluid region". The transparency increases with rising tempeatures until it attains a maximum at $T_m$. $T_m$ marks the point at which the isotropic (clear) phase first appears.

Since the appearance of the isotropic phase with crossed polarizers leads to the extinction of light, a further increase in temperature results in a decrease in the passage of light as the isotropic regions increase, until the so-called clearing temperature ($T_c$) is attained, at which the last remnants of the structure responsible for birefringency have disappeared.

GB No. 2,146,787 claims an apparatus with a material layer containing a liquid crystal polymer with a mesogenic side chain, together with devices for the thermal conversion of at least part of the material from the viscous state, in which the temperature of the material is within the range of $T_g$ to $T_f$, to the liquid state. Also claimed are devices to affect at least part of the material in the liquid state, whereby a selective change in the texture of the molecule in the material is effected and information stored, which is retained even after the cooling of the liquid region and the return to the viscous state. It is therefore an essential condition of GB 2,146,787 to use a polymer material for which $T_f > T_a > T_g$. A device is further described, in which the material layer contains a liquid crystal polymer with a smectogenic side chain. Particularly preferred are polymeric liquid crystals of the polysiloxane type with diphenylcyanogen side chains or benzoric acid ester side chains.

Great interest still exists in optical storage media which in addition to high recording densities are also capable of reversible storage. The above-described solutions of the problem of optical data storage represent relatively narrow technical solutions. Thus, the device according to GB No. 2,146,787 is based on the use of liquid crystal side chain polymers with the essential condition that the temperature be selected in a manner such that the polymeric material is maintained in a viscous state. The disclosure extends to polysiloxane liquid crystals, preferably with diphenylcyano or benzoic acid ester side chains. The stability of the information stored is not unambiguously guaranteed in view of the existing molecular mobility and the finite relaxation times and also of possible effects on the system, for example, by external interfering fields. There remains a need for technical solutions whose limits are not too narrow.

SUMMARY OF THE INVENTION

Accordingly, one object of the present invention is to provide a device for reversible optical information storage which does not depend on the polymer material being in a viscous state.

Another object of the invention is to provide a device for reversible optical information storage which is reliable and not subject to the influence of spurious fields.

A further object of the invention is to provide a device for reversible optical information storage in which information can be repeatedly stored and read without decomposition of the device.

Still another object of the invention is to provide a device for reversible optical information storage which utilizes polymeric liquid crystals.

Yet another object of the invention is to provide a device for reversible optical information storage which is versatile and can be used in a variety of applications such as, for example, optical signal processing, Fourier transformation and Fourier convolution, the production of image and imaging systems, the generation and storage of holograms, and coherent optical correlation techniques.

These objects and other objects of the present invention which will become apparent from the following specification have been achieved by the novel process of the present invention which utilizes a device comprising (1) a substrate, and (2) a liquid crystal side chain polymer film in contact with said substrate, comprising the steps of:

(a) storing information in said device by loaclly reorienting said polymer film; and (b) reading stored information from said said device by illuminating said polymer film with coherent, monochromatic light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A proces for the reversible optical storage of information by means of a liquid crystal storage medium has now been discovered, wherein information is stored in a film comprised of liquid crystal side chain polymers as the storage medium by way of local reorientation. The storage medium which contains polymeric liquid crystals with mesogenic side chains is part of an apparatus. The apparatus is designed for the entry of information by means of selective variation of the spatial order and-/or the reorientation of the polymeric liquid crystals, wherein the film containing the polymeric liquid crystals is in the state prepared for the input of the information, i.e., during the entry of the information in the dimensionally stable range below the glass temperature ($T_g$) of the polymeric liquid crystal or in the viscoelastic state above the glass temperature of the polymeric liquid crystals. The selective variation of the spatial arrangement and/or reorientation of the polymeric liquid crystals is preferably carried out locally by laser irradiation, whereupon the local state of order remains frozen after the discontinuation of the laser beam in the temperature range below the $T_g$ of the polymeric liquid crystals.

The requirements relative to the structure of liquid crystal polymers for the different orientation processes are documented in the literature. Thus, for example, a homotropic orientation in the electrical field requires a positive dielectric anisotropy for the frequency range employed. Homogeneous orientation, on the other hand, may often be produced by the limiting surfaces of structured polyimide. This requires mesogenic groups of an anisotropic form. See R. Kelker, R,. Hatz, Handbook of Liquid Crystals, Verlag Chemie 1981; Pranoto, W. Haase, Mol. Cryst. Liq. Crist. 98, 299–308 (1983), R. Zentel, R. Ringsdorf, Makromol. Chem. 182, 1245–1256 (1982); Liquid Crystals and Ordered Fluids, A. Griffin and J. F. Jonnson, Vol. 4, Plenum Press, New York (1984).

The polymer liquid crystals usable according to the invention consist entirely or in part of repeating units which may be represented schematically by general formula (I):

(I)

wherein A—B are the elements of the main chain of the polymer, X is a spacer unit and Y a mesogenic side group. The mesogenic side group are responsible for the resultant liquid crystal character. Side chains of the smectogenic type are of particular interest.

The elements A—B correspond preferably to units A'=B' which are radically polymerizable (corresponding monomers: A'=B'—X—Y).

The A'=B' units are preferably vinyl groups such as those present in radically polymerizable vinyl compounds, for example units wherein $R_1$ is hydrogen or methyl Q is a function activating the double bond, such as the groups, wherein $R_2$ is hydrogen or an alkyl with 1 to 6 carbon atoms.

The spacer group X is a flexible chain with 1-chain elements, preferably an alkyl group —$(CH_2)_n$—, wherein n is 1 to 14, and in which individual chain elements may be optionally substituted, for example, by a halogen such as chlorine, or an ether bridge.

The mesogenic side chain Y optionally contains a function connecting the spacer group X with the mesogenic group M itself, such as, for example, an group, in which $R_2$ has the same meaning as noted above.

A compilation of suitable mesogenic side groups Y is found in Kelker and Hatz, Handbook of Liquid Crystals, Verlag Chenie, ppl 67–113 (1980).

The mesoigenic group M is bonded preferably by means of the above-mentioned connecting function and contains, for example, aromatic radicals, which preferably have the following formula:

(II)

wherein L is a bridge consisting of the radicals:

or the radicals m stands for 0 or 1 and R for a radical or if m is 0, R may also signify the radical and L' and m' are the same as L and m and wherein $R_3$ is hydrogen, $(O)_r$—$(CH_2)_pH$—, —$COO(CH_2)_{p'}H$, —CN or a halogen, in particular fluorine, chlorine or bromine and p and p' are an integer from 1 to 8, in particular 1 to 6, and r is 0 or 1.

Polymers of formula (I), in which M signifies the following mesogenic groups, are mentioned especially:

(IA)

(IB)

(IC)

(ID)

(IE)

(IF)

(IG)

(IH)

(IJ)

Derivatives of (meth)acrylic acid (wherein A'=B' stands for and derivatives in which the spacer X represents a —$(CH_2)_n$— group with n=1–14, are preferred.

The polymeric liquid crystal side chain polymers may also be the product of a polycondensation. They may belong, for example, to the polyesters or polyamides having formula (III):

(III)

wherein T is a hydrocarban radical, in particular an alkyl group with 1-2 carbons atoms or an aromatic radical, Z is oxygen or a radical and $R_4$ a hydrocarbon radical corresponding to the diol of the initial compound, with 2 20 carbon atoms, in particular an aromatic, specifically a benzyl radical, and —X—Y— has the significance given for general formula (I). Specifically mentioned are polymers wherein the mesogenic groups correspond to formula IB and those in which $R_3$ stands for a —CN group. Preferred further are spacer groups in which the connecting function is an ether group and the spacer group corresponds to the formula —$[(CH_2)_2]_{6-8}$—.

The preparation of the compound of formula (III) is known. It is related to the usual polycondensation processes (Houben-Weyl, 4th ed., Vol. 14/2, Georg Thieme Verlag (1961).

Finally, the units —X—Y may also be introduced by polymer conversion into existing polymer chains. Such processes are described, for example, by C. M. Paleos et al., in J. Polym. Sci. Polym. Chem. ed. 19, 1427 (1981) and H. Finkelmann et al. in Macromol. Chem. Rapid Commun. 1, 31, 733 (1980).

They may be obtained, for example, by the addition of a suitable compound such as, for example, $H_2C=CH—Y$ (wherein Y stands for the mesogenic group) to a reactive or activatable main chain, for example, to poly[oxy(methylsilylene)].

In general, the molecular weight of the polymeric liquid crystals are within a range of $\overline{M}_W=10^3$ to $10^5$, generally with 5,000–200,000, preferably around 100,000 (determined by gel permeation chromatography).

The viscosities of the isotropic phase are generally within a range around $10^4$ poise.

The glass temperature ($T_g$) of the liquid crystal polymers used according to the invention generally is within —40 to 100° C., in particular —10 to 80° C. For glass temperatures see I. Brandrup and E. H. Immergut, Polymer Handbook, 2nd ed., II-139, J. Wiler (1975).

The apparatus

The process according to the invention is carried out preferably by means of the apparatus described below.

The liquid crystal polymer of the present invention must be adapted with regard to its absorption behavior to the wavelength of the recording laser. This is effected, for example, either by the admixture of a suitable dye or by its polymerization into the polymer chain. In the process, the dye itself may possess mesogenic character. Preferably, a polymeric liquid crystal may be used, the mesogenic groups of which are absorbent in the wavelength range required and which therefore corresponds to the extreme case of a mesogenic dye polymerized to 100%. The necessary extinction of the storage medium is thus adjusted by means of the dye concentration.

Suitable dyes are known from the literature. Dyes suitable for admixture to the liquid crystal phase are those satisfying a series of conditions. (For example, B. J. Constant et al., J. Phys.D: Appl. Phys., Vol. 11, pp. 479 ff (1978), F. Jones et al., Mol. Cryst. Liq. Crystal, Vol. 60, pp. 99 ff, 1980, EP-A No. 43 904, EP-A No. 55 838, EP-A No. 65 869.) The dyes should not be ionized under the effect of an electrical field, should have the highest possible molecular extinction coefficient and simultaneously good solubility in the liquid crystal matrix used (i.e., the storage medium) and must be chemically and photochemically stable. Dyes with such properties are found, for example, in the class of anthraquinones (EP-A No. 56 492, EP-A No. 44 893, EP-A No. 59 036, EP-A No. 54 217).

Suitable azo dyes are cited, for example, in DE-A No. 34 06 209. The proportion of the dyes in the storage medium is preferably within a range of 1 to 50% by weight.

Polymers with mesogenic groups and dye radicals in the side chains are the object of EP-A No. 7 574, EP-A 90 282, EP-A No. 1 40 133. See also H. Ringsdorf, H. W. Schmidt, Makromol. Chem. 185, 1327–1334 (1984) and B. Reck, H. Ringsdorf, Makromol. Chem. Rapid Commun. 6, 291–299 (1985). Similarly to the above-described polymeric liquid crystals of formula (I), repeating units $$-A-B-$$
$$|$$

may form the main chain elements of the dye containing monomer units. The corresponding monomers $A'=B'-X-Y'$ thus contain the dye radical in the $Y'$ group.

As example of a mesogenic group M simultaneously representing a dye radical, the group is cited. Simultaneously a spacer $-(CH_2)_6-$ is preferred. The polymer may be used in principle in the form of a thin layer (film) or a laminate, as a coating on a solid or flexible matrix layer. The thickness of the film containing the polymeric liquid crystal or consisting of it, is preferably between $10^{-3}$ and $10^{-6}$ m. In the embodiment here (FIG. 1) the apparatus according to the invention comprises a recording cell (1) consisting of two plane-parallel transparent plates (2), preferably glass plates suitably spaced apart, generally less than 1 mm, preferably about 10 micron. The plate area amounts to a few cm² to dm². The two inner surfaces of the glass plates (2) were coated with conducting $InO_2/SnO_2$ by vapor deposition and a conductive contact with the outside was established. The glass plates (2) prepared in this manner were joined together by means of a temperature resistant adhesive, for example, a silicone adhesive, so that a cell like, empty inner space is formed, with an inlet and an outlet a few mm wide.

Figure 1:
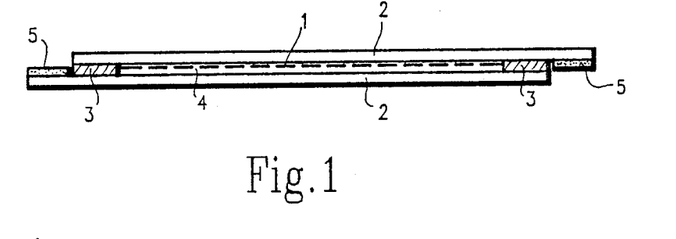
FIG. 1 discloses a device for the reversible optical storage of information comprising a liquid crystal side chain polymer disposed between two substrate plates.

The spacing desired of the two glass plates (2) is secured by means of two suitable spacers (3) of the appropriate dimension, preferably made of a polyimide plastic. The recording cell futher comprises the electrodes (4). Following the drying of the adhesive, the cell is filled on a heated deivce with the liquid crystal polymers, preferably of formula (I), in the isotropic state. The free space in the cel is filled completely by the polymer melt by capillary action.

The advantage of this process compared with the use of a partially open cell is, among others, that the inclusion of air bubbles is reliably prevented. Furthermore, standardized cell blanks may be produced at a low cost with a geometry variable between certain limits (external dimensions, spacings) which then may be filled as needed with the appropriate liquid crystal polymers in a second step as described above. Orientation is effected in a manner known in itself by the application of an oriented field (alignment field), in particular a magnetic and specifically an electric field, or by means of surface effects. The necessary orientation may be produced further by suitable shearing or drawing. In case of the application of an electric field, to the recording cell (1) filled in this manner a sinusoidal alternating voltage (V=500 V; freq. =1 kHz) is applied at temperatures above $T_g$ and the cell is cooled to room temperature while maintaining the applied voltage. The result is an absolutely transparent liquid crystal film, which visually does not differ from the material in the isotropic state. The glass temperature ($T_g$) of the liquid crystal polymer is higher than the room temperature ($T_a$). Room temperature is assumed to be 20° C. The information may be read by illuminating the polymeric film with coherent monochromatic light. To store information, different orientations of the liquid crystal polymer film are possible in the apparatus of the invention:

(1) the mesogenic groups are aligned parallel to the surface normal of the polymer film in a uniform manner. This may be carried out by the application of an alternating electric field to the plates (2) coated with (transparent) electrodes, wherein the electric field is parallel in the normal of the polymer film layer, by the application of a magnetic field or by means of surface treatments.

(2) The mesogenic groups are oriented parallel or inclined to the film plane and parallel to a macroscopically predetermined direction. This may be obtained by coating the plates (2) by a suitable material, such as polyimide and by structuring this coating along the desired preferential orientation, or by a suitable oblique coating for example with silicon oxide. The necessary orientation may also be produced by shearing or drawing.

In both cases (1) and (2) orientation takes place in the liquid crystal state.

The orientation is frozen in by cooling to the glass state. The recording cell (1) produced as described above represents the storage medium proper for the storage of optical information. The variation centers by means of a focused laser beam which converts the oriented liquid crystal polymer layer locally into the isotropic phase. The locally produced macroscopic isotropic region is frozen below the glass temperature. The process is preferably carried out as follows.

According to the invention, the film formed from the liquid crystal polymer is heated at the interference maxima of an interferometrically produced grid by localized heating from room temperature to the isotropic phase. A laser beam, for example light with a wave length of 514.2 nm of an argon laser is used. A focused laser beam may also be used, wherein the laser beam and the storage medium are moved in a defined manner relative to each other.

The discontinuation of the laser light and subsequent cooling lead to stable, disoriented (macroscopically isotropic) regions. The scatter centers produced in this manner may be read out as optical information. The absorption behavior of the storage medium is preferably chosen so that the information may be read in by means of a laser beam of a suitable wave length and read out with another laser beam of a different wave length without disturbing the information.

The experimental setup for the evaluation of the storage properties of the above-described recording cell is based on a Mach-Zehnder interferometer (Encyclopedia of Natural Sciences and Techology, Vol. 2, Moderne Industrie Press, 1980). By these means, sinusoidal intensity grids with a line spacing of between 100 micron and 1.0 micron, may be produced for the superposition of two linearly polarized planar partial waves. By the superposition of a planar wave with a sperical wave in combination with a convex lens, the intensity distribution similar to a Fresnel zone plate may be realized.

Nonlinear optical effect (Optically induced Frederiks transition)

The electric field of the linearly polarized laser writing light source induces a local modulation of the refractive index on the basis of the positive polarizability anisotropy of the liquid crystal molecules, which may be read out by a second laser beam (linearly polarized wave of a helium-neon laser) as a phase object. This is obtained by means of a directional local reorientation of the liquid crystal molecule in the optical field. The reorientation (optically induced Frederiks transition) takes place above the glass temperature of the liquid crystal polymer in an anisotropic phase. During subsequent cooling the refractive index is frozen in below $T_g$ as the phase object. The film may remain visually entirely clear.

The temperature may be adjusted externally by heating, wherein the frequency of the writing laser is of no decisive importance. Preferably, the temperature is set by the absorption of the writing laser and cooling is effected by turning off the laser. The writing laser should satisfy two conditions simultaneously:
 (a) the optical fireld strength at the interference maxima must be above the "Frederiks threshold voltage" for the liquid crystal polymer chosen, and
 (b) the intensity must be chosen so thatthe temperature is increased at the interference maxima by absorption in a manner such that the polymer is heated over the glass temperature but not above the nematic-isotropic phase transition ($T_{NI}$).

By the suitable correlation of the laser wave length and the liquid crystal polymers different degrees of reorientation are possible, corresponding to a continuous phase modulation in addition to purely binary information (maximum possible reorientation).

An aspect of the present process of extreme industrial interest is the ability to produce a phase object with high diffraction efficiencies, which is highly important for otical analog technology (conventional holography, synthetic holography).

The experimenhtal setup for the evaluation of the storage propoerties of the afore-described recording cell is based on a Mach-Zehnder interferometer (Encyclopedia of Natural Science and Technology" Vol. 2, Moderne Industrie Press 1980). By the superposition of two linearly polarized planar partial waves sinusoidal intensity grids may be produced with line spacings between 100 micron and 1.0 micron. An intensity distribution similar to a Fresnel zone plate is obtained by superposing a spherical wave on a planar wave in combination with a convex lens.

Extinction of stored information

In principle, the information stored may be erased by an increase in temperature (above $T_{NI}$) and cooling in an electric or magnetic field. The extinction of stored information may be effected locally by an increase in temperature and subsequent cooling in an electric or magnetic field with the restoration of the original state of orientation in local areas. Alternatively, all of the information stored may be erased and the original state restored, by increasing the temperature of the storage medium and cooling it in an electric or magnetic field.

The process is preferably carried out as follows.

Similarly to the preparation of the first writing process the information stored in the liquid crystal polymer is erased by heating the recording cell (1) above $T_g$ and subsequently cooling it with the application of an alternating voltage (V=500 V, freq.=1 kHz). Following multiple repetitions of the writing and erasing processes, it was determined that none of the steps carried out caused irreversible changes in the recording cell.

Reversible analog data storage

As set forth above, the application of the nonlinear optical effect makes it possible to store data optically in an analog manner, read them optically, erase them as needed and store data repeatedly. The data may be stored by holographic methods in the storage medium according to the invention. As a rule, the information to be stored concerns reproducible material structures, for example objects or two-dimensional objects, such as printed pages or graphical images. The structure to be stored is illuminated by means of a coherent, monochromatic source of light. The interference pattern, which is determined by the direction, amplitude and phase location of the light from the structure to be stored relative to a reference light wave originating in the same source of light, is recorded holographically in the preferably macroscopically oriented film of a liquid crystal polymer and stored. The thickness of the liquid crystal polymer film here again is preferably between 1 and 20 micron. The plane parallel transparent plates may be made of transparent plastics such as PMMA or preferably of inorganic glasses.

Preferably, the storage medium contains dyes. The dye molecules may be components of the liquid crystal polymer or they may be mixed into the storage medium and distributed therein. The glass temperature ($T_g$) of the liquid crystal polymer is higher than the room temperature ($T_a$). The information may be read out by illuminating the polymer film with a monochromatic coherent light. Different orientations of the liquid crystal polymer film are possible for the storage of the information in the apparatus according to the invention (FIG. 1): (1) The mesogenic groups are aligned parallel to the surface normal of the polymer film layer in a uniform manner. This may be effected by the application of an alternating electric field to the plates (2) coated with (transparent) electrodes, with the electric field parallel to the normal of the polymer film layer, by the application of magnetic field or by a surface treatment. (2) the mesogenic groups are oriented parallel or inclined to the plane of the film and parallel to a macroscopically predetermined direction. This may be carried out either by the coating of the plates (2) with a suitable material, such as polyimide, and by the structuring of the coating along the preferred orientation desired, or by an oblique coating of the substrate with silicon oxide. The necessary orientation may also be obtained by suitable shearing or drawing. The orientation is frozen into the glass state by cooling.

The storage is effected in the above-described manner with a laser being used as the monochromatic source of light, the wave length of which is within the absorption range of the storage medium. Reading is by means of a laser the wave length of which is absorbed to a much lesser extent by the storage medium. The storing and reading may take place at room temperature with the solid film. The information is erased by heating the specimen in the anisotropic or isotropic range above the glass temperature.

Reversible digital data storage

A further embodiment of the invention concerns digital data storage by optical means, with here again optical reading and erasing and reentry of information being provided. In this process, in the optically clear, preoriented liquid crystal polymer film of the storage medium a digital phase structure is produced by means of a monochromatic laser beam. The laser beam and the storage medium are moved relative to each other in a defined manner and the internsity of the laser beam is modulated. The stored information is read by the defined relative motion of the storage medium and a laser beam of constant intensity and a suitable wave length, which leaves the stored information unaffected.

The technical preparation of the storage medium (alignment of the polymers) is similar to the reversible analog data storage. Information storage is effected in the above-described manner with a laser being used as the monochromatic source of light, the wave length of which is within the absorption range of the storage medium. Reading is by means of a laser, the wave length of which is absorbed to a much lesser extent by the storage medium used. Storing and reading may take place at room temperature with the solid film. The information is erased by heating the specimen in the anisotropic or isotropic range above the glass temperature.

Reversible synthetic holography

In this process a phase structure is produced in a preoriented liquid crystal plastic film by digital means, in the above-described (for reversible digital data storage) manner, by the defined relative motion of the writing laser beam and storage medium. Reading is effected not as in the case of digital storage by a defined relative motion of the reading beam and the storabe medium but by the complete illumination of the synthetic hologram with a reference wave. The necessary information for the determination of the intensity modulation required must be determined by calculation. The process described makes it passible to procuce phase structures with defined optical properties, such as lenses and the like. As this is accomplished by computation in a digital form, complex processing processes (glass grinding, polishing) may be substantially simplified. The lighter weight of these optical components (eyeglasses, lenses) is also highly important.

Advantageous effects

. The apparatus according to the invention for reversible optical data storage is highly suitable for use in the field of reversible digital information storage (EDRAW).

A further extremely interesting potential application is found in the field of analog information processing (holography). This field is concerned primarily with industrial process control. By means of the optical analog technology, important phases of the product control such as recognition, sorting and testing, may be carried out on the basis of coherent optical correlation very rapidly and efficiently.

Preparation of the liquid crystal polymers

The polymers that may be used according to the invention, in particular those of formula (I), may be prepared in a known manner. See De-A No. 27 22589, DE-A No. 28 31 909, DE-A No. 30 20 645, DE-A No. 30 27 757, DE-A No. 32 11 400, and EU-A No. 90 282.

Copending application Ser. No. 262,031 filed Oct. 26, 1988 discloses the preparation of liquid crystal polymers and is incorporated herein by reference.

EXAMPLE 1

Direct connection of the spacer mesogenic groups

As an example, the preparation of compounds of Type IA is described (V.P. Shibaev et al., Eur. Polym. J. 18, 651 (1982). In this process, a compound of formula (III)

$$Br-(CH_2)_{n'}-COOH) \quad (III)$$

wherein $n'=n-1$, is reacted with an organic acid chloride, such as $SOCl_2$, preferably in DMF, to produce compound (IV).

$$Br-(CH_2)_{n'}-COCl \quad (IV)$$

Compound (IV) is reacted in a Friedel-Crafts reaction, for example in nitrobenzene with biphenyl to produce a compound of formula (V)

$$Br-(CH_2)_{n'}-CO-C_6H_4-C_6H_5 \quad (V)$$

which may be reduced to compound (VI) for example with lithium-aluminum hydride.

$$Br-(CH_2)_{n}-C_6H_4-C_6H_5 \quad (VI)$$

This compound is then reacted with $Cl_2CHOC_4H_9$ and titanium tetrachloride to form compound (VII).

Compound (VII) is converted preferably with hydroxylamine salt in the presence of a base such as pyridine to an oxime and the oxime is converted into nitrile (VIII) by elimination of water, for example with the aid of an anhydride, such as acetic anhydride.

(VIII)

By the reaction of a salt of (meth)acrylic acid, for example in DMF with compound (VIII), a type IAa compound is obtained.

IAa wherein $R_1$ stands for hydrogen or methyl.

In a directly analogous manner compound IAb may be obtained for example from compound (V) and a salt of (meth)acrylic acid.

IAb

EXAMPLE 2

Spacer-mesogenic groups connection by means of an ether group

As an example, the preparation of a compound of Type IA is described. (V.P. Shibaev, loc. cit., N.A. Plate, V.P. Shibaev, J. Polym. Sci. Polym. Symp. (IUPAC 1978) 67, 1 (1980).

Compound (IV) is reduced for example with lithium-aluminum hydride in ether to compound (IX)

which with compound (XI)

(XI)

is converted for example in methanol to compound (XII).

(XII)

The hydroxy compound (XII) is reacted with the chloride of (meth)acrylic acid in the presence of an acid acceptor, such as for example a tertiary amine to form compound IAc.

IAc

The following synthesis process permits great variability relative to structure IA and IE–IJ (M. Portugall, H. Ringsdorf, R. Zentel, Makromol. Chem. 183, 2311 (1982); Ringsdorf, A. Schneller, Brit. Polym. J. 13, 43 (1981).

In the process, compound (XIII)

(XII)

is reacted with compound (XIV) in the presence of the base (XIV)

to prepare the acid (XV).

(XV)

This acid is reacted with (meth)acrylic acid in the presence of an acid catalyst, for example with ptoluenesulfonic acid in chloroform to form the (meth)acrylic ester (XVI)

(XVI)

Compound (XVI) may be converted similarly to (III) into the acid chloride, which may be reacted with phenol or with a phenol substituted in the para position to form compound IE (IE)

or compounds IE, IF, IG, IH, or IJ.

EXAMPLE 3

Spacer-mesogenic group connection by an ester group

As an example, the preparation of a compound of the IA type is described. (Plate et al. loc. cit.; Shibaev et al. loc. cit.), but the process is generally applicable to the IA-IJ mesogenic radicals.

Compound (IV) may be reacted with a para-phenol corresponding to one of the mesogenic groups, to obtain for example compound (XVII).

(XVII)

preferably in the presence of an acid receptor and in an inert solvent, such as THF.

Further conversion is carried out with a salt of (meth)acrylic acid. The following synthesis is mentioned as an example of compounds being a chiral center of formula (XVIII)

(XVIII)

is reacted with the bromide of formula (XIX) in the presence of an alkaline alcoholate (XIX)

to produce the phenol (XX).

(XX)

By reaction of (XX) with compound (XIV) in ethanol with the addition of a base, the alcohol (XXI) is obtained

(XXI)

which is esterified with (meth)acrylic acid

In a manner similar to the (XIV-XV) reaction, the reaction of compound (XIV) with the phenol of formula (XXII) in the presence of a base, such as for example potassium carbonate or potassium hydroxide, in acetone (XXII)

produces the alcohol of formula (XXIII)

(XXIII)

which may be converted by reaction with (meth)methacrylic acid chloride into a compound of type IB.

Acid amides of formula (I) may be obtained for example by reacting (meth)acrylic acid chloride with the amine of formula (XXIV)

(XXIV)

to obtain (meth)acrylic acid amide (XXV)

(XXV)

which may be converted into type ID compounds for example by reaction with in the presence of an inert base with a phenol containing the mesogenic group, such as for example (XXVI)

Polymerization of the monomers

In the polymerization of monomers, for example of Type I, state of the art polymerization methods may be used. See Houben-Weyl, 4th ed., Vol. 14/1, Georg Thieme Press (1961); H. Rauch-Puntigam, Th. Völker "Acryl and Methacryl Verbindungen", Springer Berlin (1967); Kirk-Othmer, 3rd ed. Vol. 18, J. Wiley (1982). Schildknecht, Skeist, Polymerization Processes, Vol. 29 of "High Polymers", p. 133 Wiley-Interscience (1977).

Radical polymerization may be used to polymerize the compounds of formula (I). As examples, polymerization in solution, in a suspension/emulsion or bead polymerization, may be mentioined.

Conventional radical initiators are used, such a azo- or peroxy-compounds (Rauch-Puntigam, Völker, loc. cit. or Brandrup, Immergut, Polymer Handbook, loc. cit.) in the amounts specified, for example 0.1 to 1% by weight with respect to the monomers. Examples include azoisobutyronitrile dibenzoylperoxide and dilauroyl-peroxide.

Optionally, the polymerization may be controlled by the use of regulators, such as for example conventional sulfur regulators, generally in proportions of 0.5 to about 2% by weight with respect to the monomers (DE-A No. 10 83 548).

The usual temperatures and processing methods may be employed.

The process is illustrated below with the example of the (meth)acrylic acid derivatives of formula (I), i.e.

$A' = B'—X—Y$ corresponds to

Polymerization process in solution

Approximately 0.35 mole of the monomer of formula (I) are dissolved in 850 ml toluene. 1.8 mmole azoisobutyronitrile is added and the solution is heated for about 8 hr under an inert gas at about 333° K.

The polymer formed is obtained by precipitation with a precipitating agent, such as for example 1200 ml of methanol, separated and purified by solution in a suitable solvent, such as for example dichloromethane and reprecipitation with methanol.

The material obtained in this manner, which usually is of the consistency of a powder, may be dried in a water jet vacuum at about 303° K. to constant weight.

The glass temperature and the clarification temperature are determined by thermal analysis.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for reversible optical information storage which utilizes a device comprising (1) a substrate, and (2) a film comprising a liquid crystal side chain polymer in contact with said substrate, comprising the steps of:
   (a) storing information below the glass temperature of said liquid crystal side chain polymer and within the stable shape retention state of said polymer on said device by locally reorienting said film; and
   (b) reading stored information from said device by illuminating said film with coherent monochromatic light.
2. The process of claim 1, wherein said film is macroscopically oriented.
3. The process of claim 1, wherein said film is macroscopically disoriented.
4. The process of claim 1, further comprising:
   erasing stored information by locally heating said film; and
   cooling said film in an electric, magnetic or surface active field, whereby the original state of orientation is locally restored.
5. The process of claim 1, further comprising:
   erasing the entirety of stored information by heating all of said film; and
   cooling said film in an electric, magnetic or surface active field, whereby the state of orientation is restored to the entire film.
6. The process of claim 1, further comprising:
   erasing the entirety of stored information from said film by heating said film to a temperature above the nematic-isotropic temperature; and
   cooling said film.
7. The process of claims 6 or 7, wherein said heating produces an anisotropic, liquid phase of said liquid crystal polymer.
8. The process of claims 6 or 7, wherein said heating produces an isotropic phase of said liquid crystal polymer.
9. The process of claim 1, wherein said liquid crystal polymer has a molecular weight $\overline{M}n$ within a range of $10^3$ to $10^5$.
10. The process of claim 1, wherein said reorienting is performed by heating with a laser.
11. The process of claim 10, wherein said storing is performed by a laser of suitable wavelength and intensity and said reading is performed by a different laser having a different wavelength, without interfering with the stored information.
12. The process of claim 1, wherein said liquid crystal side chain polymer comprises repeating units having the formula wherein A—B is an element of the main chain polymer, X is a spacer unit and Y is a mesogenic side group.
13. The process of claim 12, wherein said mesogenic side group is of the smectogenic type.
14. The process of claim 12, wherein said repeating units are acrylate or methacrylate units.
15. The process of claim 12, wherein said repeating units are polyester units.
16. The process of claim 1, wherein said film is disposed between two plates or films arranged one above the other.
17. The process of claim 10, further comprising:
    adjusting the absorption range of said film to correspond to the wavelength of said laser.
18. The process of claim 17, wherein said adjusting is performed by a dye.
19. The process of claim 17, wherein said adjusting is performed by copolymerizing a dye-containing comonomer with the repeating monomers of said liquid crystal side chain polymer.
20. The process of claim 18, wherein said adjusting is performed by varying the dye concentration.
21. The process of claim 1, wherein said reading step is performed with light having a wavelength outside the absorption maximum of said film.
22. The process of claim 1, wherein said storing step is performed by holographically illuminating said film, whereby an interference pattern is stored.
23. The process of claim 22, wherein said storing step is performed in an optical analog manner and said reading is performed by illuminating said film with coherent monochromatic light.
24. The process of claim 10, wherein said storing step stores digital phase structure.
25. The process of claim 24, wherein said laser and said film are moved relative to each other during said storing and reading steps.
26. The process of claim 24, or 25, wherein said laser is modulated during said storing step.
27. The process of claim 26, wherein a digital phase structure is stored in said film by means of a predetermined intensity modulation and said reading is performed by illuminating said film with a reference light source.
28. The process of claim 27, wherein said intensity modulation si determined by computation.
29. The process of claim 22, wherein the information density produced from said storing step is at most 2000 lines per mm.
30. The process of claim 1, wherein said information is optical signal process information, Fourier transformation and Fourier convolution information, image processing information, coherent optical correlation information or holographic information.
31. The process of claim 1, wherein said reorienting is performed by the application of an electrical field.

* * * * *

UNITED STATES PATENT AND TRADEMARK OFFICE
CERTIFICATE OF CORRECTION

PATENT NO. : 4,837,745
DATED : June 6, 1989
INVENTOR(S) : Manfred EICH, et al

Page 1 of 2

It is certified that error appears in the above-identified patent and that said Letters Patent is hereby corrected as shown below:

Column 4, line 65, change "loaclly" to --locally--

Column 5, line 16, change "proces" to --process--

Column 6, line 21, change "1-chain" to --1 - 14 chain-- line 40, change "mesoigenic" to --mesogenic--

Column 8, line 8, change "hydrocarban" to --hydrocarbon--

Column 9, line 67, change "futher" to --further--

Column 10, line 3, change "cel" to --cell--

Column 11, line 15, change "techology" to --technology-- line 48, change "thatthe" to --that the-- line 53, change "wave length" to --wavelength-- line 61, change "otical" to --optical-- line 63, change "experimenthal" to --experimental-- line 64, change "propoerties" to --properties--

Column 10, line 55, after "The variation*" insert ----*according to the present process -thur- production of scatter--.

UNITED STATES PATENT AND TRADEMARK OFFICE
CERTIFICATE OF CORRECTION

PATENT NO. : 4,837,745
DATED : June 6, 1989
INVENTOR(S) : Manfred EICH, et al

It is certified that error appears in the above-identified patent and that said Letters Patent is hereby corrected as shown below:

Column 13, line 42, change "absorged" to --absorbed-- line 62, change "procuce" to --produce-- line 62, change "passible" to --possible--

Column 17, line 45, change "(meth)methacrylic" to --(meth)acrylic--

Column 18, line 21, change "mentioined" to --mentioned--

Column 20, line 46, change "si" to --is--

Signed and Sealed this

Ninth Day of October, 1990

Attest:

HARRY F. MANBECK, JR.

*Attesting Officer*      *Commissioner of Patents and Trademarks*